United States Patent Office 3,006,580
Patented Oct. 31, 1961

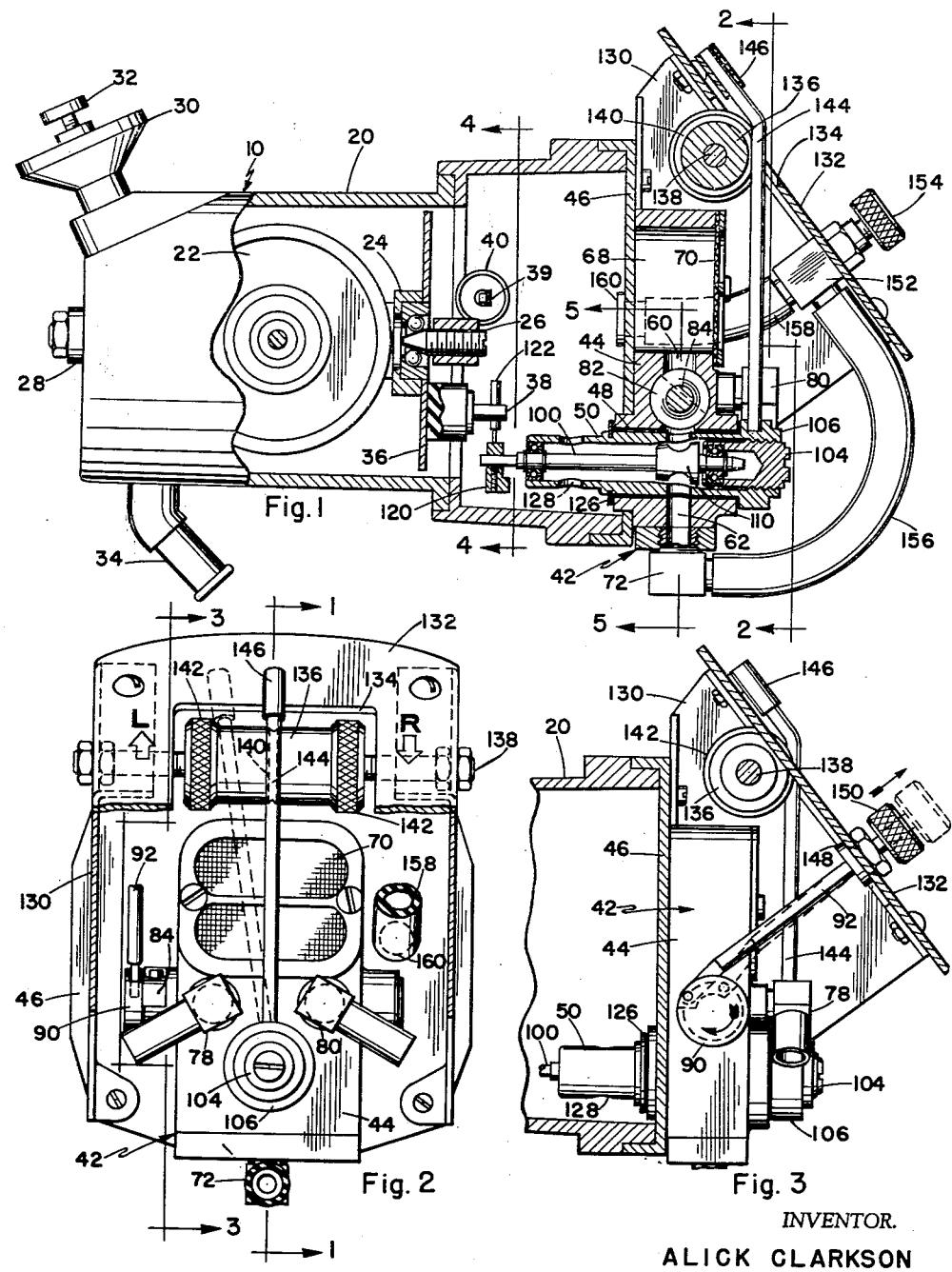
Oct. 31, 1961   A. CLARKSON   3,006,580
FLIGHT CONTROL MEANS FOR AIRCRAFT
Filed Feb. 9, 1959   4 Sheets-Sheet 1
INVENTOR.
ALICK CLARKSON
BY
Knox & Knox INVENTOR.
ALICK CLARKSON
BY
Knox & Knox

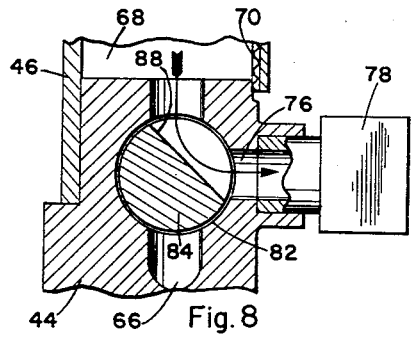
Fig. 8
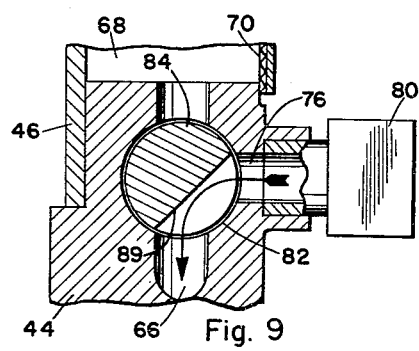
Fig. 9
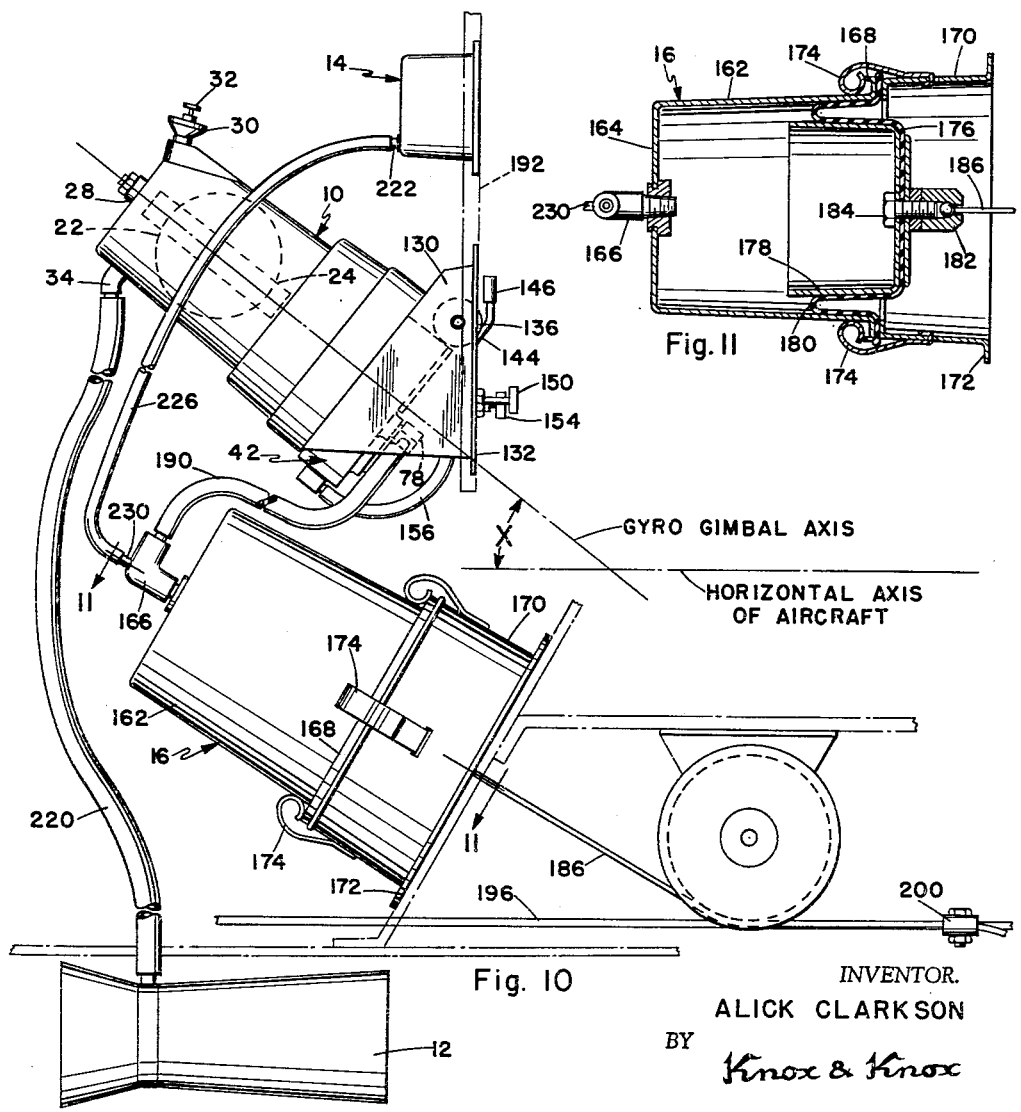
Fig. 10
Fig. 11
INVENTOR.
ALICK CLARKSON
BY
Knox & Knox

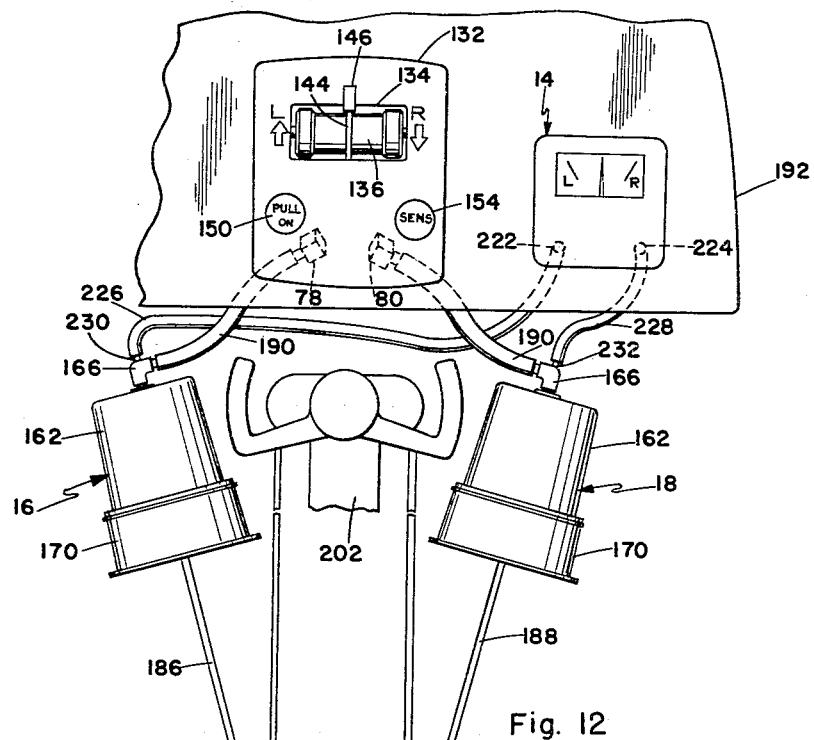
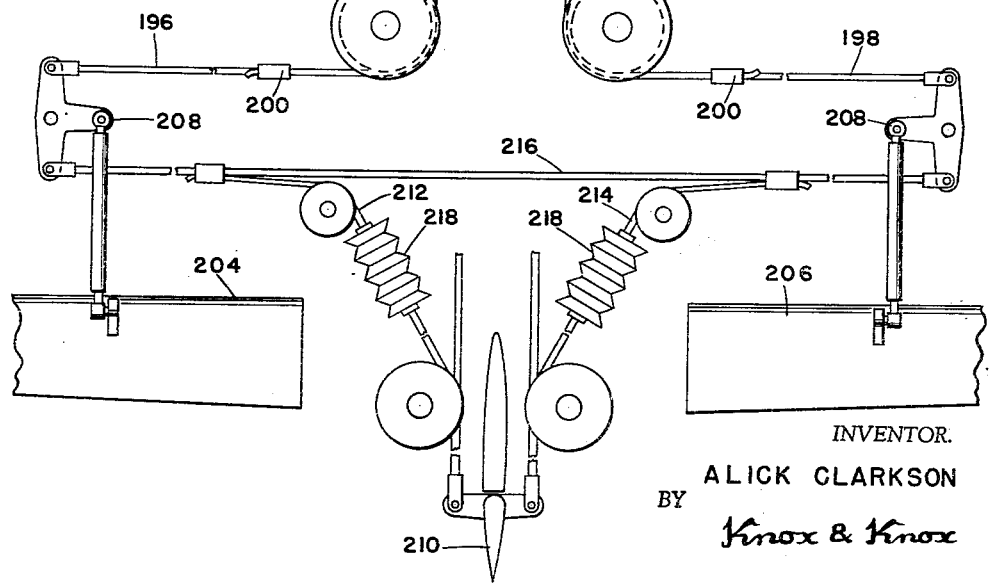
Fig. 12
INVENTOR.
ALICK CLARKSON
BY
Knox & Knox

3,006,580
FLIGHT CONTROL MEANS FOR AIRCRAFT
Alick Clarkson, Paul Spur, Ariz.
Filed Feb. 9, 1959, Ser. No. 791,905
9 Claims. (Cl. 244—78)

The present invention relates generally to aircraft controls and more particularly to a flight control means for aircraft.

The primary object of this invention is to provide a flight control means which, with a single gyro mechanism and a novel valve arrangement, controls yaw and roll motions of an aircraft within close, preset limits.

Another object of this invention is to provide a flight control means which is completely powered by a vacuum source, such as a venturi or the like, and is independent of the other power services of the aircraft.

Still another object of this invention is to provide a flight control means which can be adjusted in flight for sensitivity to conform to existing air conditions and which can be easily turned on and off by a single control.

A further object of this invention is to provide a flight control means having a simple, manually operated centering control to adjust for straight line flight, the control incorporating a lever which can be offset to either side to hold the aircraft in a turn at any desired constant rate.

An important object of this invention concerns the fact that the flight control means does not interfere with normal operation of the aircraft controls and can be overridden at any time, which makes it possible to leave the control on during take-off and landing to stabilize the aircraft, if necessary, during the climb or landing approach, yet in operation the flight control is firm and steady.

Another object of this invention is to provide a flight control means which includes an indicator to show any deviation from straight line flight or pre-set turn and which serves as a reference to set the initial trim of the control.

It is also an object of this invention to provide a flight control means which may be installed in many types of light aircraft, either single or multi-engined, having manually operated flying controls although it is feasible that the control means may be coupled to a power operated control system by using suitable servo devices.

Finally, it is an object to provide a flight control means of the aforementioned character which is simple, safe and convenient to install and operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a longitudinal sectional view of the primary flight control instrument, taken on the line 1—1 of FIGURE 2, a portion of the casing being shown in elevation;

FIGURE 2 is a front elevation view of the instrument with the front panel portion cut away as on the line 2—2 of FIGURE 1;

FIGURE 3 is a fragmentary sectional view taken on the line 3—3 of FIGURE 2;

FIGURE 8 is a fragmentary sectional view taken on the line 8—8 of FIGURE 5;

FIGURE 9 is a fragmentary sectional view taken on the line 9—9 of FIGURE 7;

FIGURE 10 is a diagrammatic side elevation view showing the instrument as mounted in an aircraft and connected to the aircraft controls and a vacuum source;

FIGURE 11 is a sectional view taken on the line 11—11 of FIGURE 10, showing the structure of a vacuum powered actuator;

FIGURE 12 is a diagrammatic top plan view showing the manner in which the flight control means is coupled to the aircraft flying controls.

Similar characters of reference indicate similar or identical elements and portions throughout the specification and throughout the views of the drawings.

Figure 4:
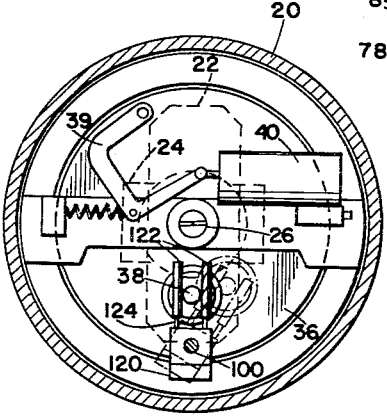
FIGURE 4 is a sectional view taken on the line line 4—4 of FIGURE 1.

Referring now to the drawings in detail, the flight control means includes a sensing instrument 10, a vacuum source illustrated as a conventional venturi 12, an indicator 14 and a pair of vacuum operated actuators 16 and 18 which impart the actual motions to the aircraft control surfaces.

The sensing instrument 10 comprises a casing 20 in which is mounted a freely rotatable gyro 22 suspended in a gimbal cage 24, which, in turn, is pivotally mounted on a pair of opposed bearings 26 and 28 on the longitudinal axis of the casing, which is normal to the rotational axis of the gyro. The gyro 22 is of the air jet driven type, the casing 20 having an air inlet 30 with a control valve 32 and a vacuum outlet 34. Fixed to the gimbal cage 24 at the front bearing 26 is a plate 36 on which is mounted a guide pin 38. The gyro 22, its mounting, casing, air supply and valve, and the plate with guide pin 28 comprise a gyro sensing unit commonly used in present aircraft instruments, one which is readily available and easily adapted for use in the present flight control means. Such a gyro unit usually is coupled to a spring biased lever 39 which serves to center the gyro frame and also as an output load against which the effectively increased inertia of the spinning gyro can operate. This centering mechanism causes the gyro to be rate sensitive as opposed to a freely suspended gyro wheel. The conventional damping device 40 is connected to the lever 39 to limit oscillation of the gyro frame and prevent overswing. Other types of gyro mechanisms may be suitable for use in the present system and, since such units are conventional, only sufficient detail of the gyro assembly has been illustrated to facilitate the description of the operation of the instrument as a whole.

Mounted on the open front end of the casing 20 is a valve assembly 42 comprising a block 44 fixed to an end cover 46, which fits closely on the casing. The block 44 has a main bore 48 parallel to the axis of the gyro gimbal bearings 26 and 28, but radially offset therefrom in the lower portion of said block, and mounted in said bore is a closely fitted valve sleeve 50 having limited rotation. The valve sleeve 50 has four ports in one general plane which, in relation to the instrument as positioned in the aircraft, include an upper port 52, a lower port 54, a left port 56 and a right port 58. The block 44 has four internal passages communicating with the ports 52–58, and including an upper passage 60, a lower passage 62 and left and right passages 64 and 66, respectively. The upper passage 60 leads to an inlet chamber 68 in the upper portion of the block 44, said inlet chamber being open to atmosphere and having its opening covered by a suitable screen or filter 70 to exclude dust and other foreign matter. The lower passage 62 extends to the bottom of the block 44 and is provided with an elbow connector 72, while the left and right passages 64 and 66 both curve upwardly and communicate with the inlet chamber 68 on either side of the upper passage 60. In the front face of the block 44 are a left outlet 74 and a right outlet 76 communicating with the left and right passages 64 and 66 respectively, said outlets being fitted with suitable connectors 78 and 80.

Figure 5:
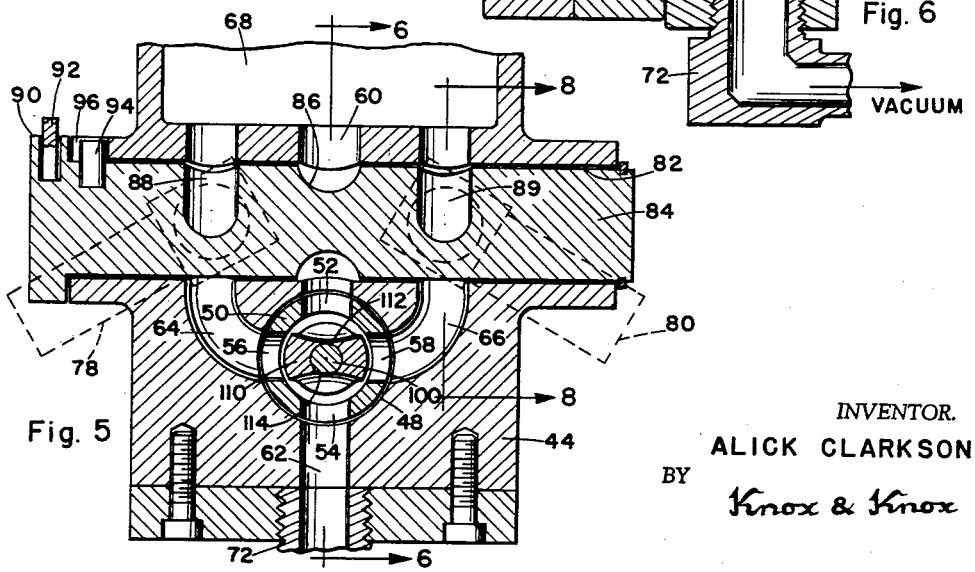
FIGURE 5 is an enlarged, fragmentary sectional view taken on the line 5—5 of FIGURE 1, showing the valve in off position.

Extending transversely across the block 44, above the bore 48, is a further bore 82 which intersects the upper passage 60 and the left and right passages 64 and 66. Inside the bore 82 is a close fitting barrel valve 84 having an annular groove 86 aligned with the upper passage 60, so that air can flow through the passage at all times. The barrel valve 84 also has a pair of channels 88 and 89 cut substantially diametrically therein, their depth being slightly less than half the diameter of the barrel valve, said channels being aligned with the left and right passages 64 and 66. In one position of the barrel valve 84, the channels 88 and 89 interconnect the inlet chamber 68 with the outlets 74 and 76 respectively, this being the off position of the mechanism, as in FIGURES 5 and 8. When the barrel valve 84 is rotated 90°, the channels 88 and 89 interconnect the outlets 74 and 76 with the ports 56 and 58 respectively, which is the on position, as in FIGURES 7 and 9. At one end of the barrel valve 84 is an enlarged boss 90 having a control rod 92 pivotally attached thereto, the barrel valve having a stop pin 94 fixed therein which rides in an arcuate notch 96 in the block 44 to limit the rotational movement, so that the channels 88 and 89 are properly aligned in the on and off positions.

One end of the valve sleeve 50 extends through the end cover 46 into the casing 20, and this inner end contains a ball bearing 98 which supports one end of a valve stem 100, the other end of said valve stem riding in a second ball bearing 102 mounted in an adjusting plug 104. The outer end of the valve sleeve 50 projects from the front of the block 44 and has an enlarged hub portion 106, the adjusting plug 104 having a screw threaded portion 108 which is threaded into said hub portion. Fixed on the valve stem 100 is a tapered cylindrical valve element 110 having a pair of parallel, opposed diametrical channels 112 and 114, which are substantially aligned with the ports 52 and 58. The internal bore 116 of the valve sleeve 50 has a tapered portion 118 in the area of the ports 52–58, corresponding to the taper of the valve element 110 so that, by shifting the valve element axially by means of the adjusting plug 104, the annular clearance between said valve element and the tapered bore portion can be varied. The bearing 98 is fixed to the valve stem 100 and is axially slidable in the sleeve 50 to accommodate the axial movement. Fixed to the inner end of the valve stem 100 is a small fitting 120, which is oriented to hold the valve element 110 in a normal static position with the channels 112 and 114 horizontal, the solid portions of said valve element partially blocking the left and right ports 56 and 58 equally in this position, as in FIGURE 5. Extending upwardly from the fitting 120 are two spaced prongs 122 having thin resilient lower portions 124, said prongs straddling the guide pin 38, as illustrated in FIGURE 4, the resilient portions holding the prongs in light but positive contact with said guide pin. The valve element 50 is held against axial displacement by a split ring 126 bearing against the inner face of the block 44, the portion of said valve sleeve inside the casing 120 containing a pair of bleed holes 128.

Secured to the end cover 46 is a bracket 130 having a face plate 132, the bracket being shaped so that the face plate is disposed at an angle to the axis of the sensing instrument 10, the purpose for which will hereinafter be explained. In the upper portion of the face plate 132 is a generally rectangular slot 134, in which is mounted a centering drum 136 adjustable along a screw threaded shaft 138 fixed transversely across the bracket 130. The centering drum 136 has a central annular groove 140 and an enlarged knurled portion 142 at each end thereof.

Fixed in the hub portion 106 of sleeve valve 50 is a control bar 144, which extends upwardly through the slot 134 and has an upper indicator portion 146 bent parallel to the face plate 132. The control bar 144 rests in the annular groove 140 and has sufficient resiliency and frictional contact to prevent the centering drum 136 from rotating inadvertently. At one side of the face plate 132 is a bushing 148 through which the control rod 92 extends, said control rod being fitted with a suitable knob 150. At the opposite side of the face plate 132 is mounted a small throttling or sensitivity valve 152 of conventional type and having a knob 154, a hose 156 extending from said valve to the elbow connector 72. A second hose 158 extends from the sensitivity valve 152 to a vacuum connection 160 on the end cover 46 and communicating with the interior of the casing 20. Since the gyro 22 is vacuum operated by the venturi 12 connected to the vacuum outlet 34, the casing 20 is a constant source of vacuum during operation and provides a convenient vacuum plenum chamber to operate the flight control system. Thus the vacuum connection 160 from the casing 20 furnishes the necessary vacuum, controlled by the sensitivity valve 152. The barrel valve 84 control the vacuum flow through the valve assembly 42 but does not affect the gyro 22, which is always in operation and enables the apparatus to be put into immediate use at any time.

The actuators 16 and 18 are identical and each comprises a generally cylindrical can 162 having a closed end 164 in which it fitted an inlet 166. The open end of the can 162 has an outwardly extending peripheral flange 168 against which is clamped a support sleeve 170, said support sleeve having an end flange 172 for attachment to aircraft structure and being secured by a plurality of spring clips 174 engaging the flange 168, as in FIGURE 11. As an alternative, suitable brackets may be attached directly to the can 162 for securing the actuator in an aircraft. A large flexible diaphragm 176 is clamped by its outer edge between the flange 168 and the support sleeve 170, and a generally cylindrical piston 178 is secured to the center of said diaphragm on the inner surface thereof, so that the piston is contained inside the can 162. The diaphragm 176 has sufficient slack to provide a return folded annular portion 180 which extends into the can 162 and allows the piston 178 a considerable range of free axial movement. A cable connector 182 is secured to the center of the piston 178 by a bolt 184, said cable connector retaining one end of a servo control cable 186 in the case of the actuator 16. The actuator 18 is coupled to a similar servo control cable 188.

The left actuator 16 is connected to the left outlet 74 by a vacuum hose 190 from the connector 78 to the inlet 166 and similarly, the actuator 18 is connected to the right outlet 76 by a second vacuum hose 190 from the connector 80 to its inlet 166, as in FIGURES 10 and 12.

With reference to FIGURE 10, the sensing instrument 10 is mounted in an aircraft on the instrument panel 192, indicated in broken line, with the face plate 132 flat on the panel. The shape of the bracket 130 is such that the sensing instrument 10 is held with its axis tilted upwardly behind the instrument panel 192, so that the gyro gimbal cage 24 is rotatable about an axis inclined to the horizontal axis of the aircraft, the angle being indicated at X. By so inclining the gyro gimbal axis, the single gyro 22 is affected by motion of the aircraft in both roll and yaw planes. This double function of the gyro 22 provides a motion sensing system in which the roll control loop is not closed but has an inertial function, since the sensing element is essentially a rate gyro. The control signal obtained is generally proportional to the actual displacement from normal and any resulting inaccuracy develops into a yaw function which is corrected by the rate gyro yaw component, thus closing the loop. In actual practice, however, the error is negligible and the single rate gyro provides swift and accurate detection of any displacement in roll or yaw.

The angle of inclination X may vary slightly for different aircraft and the bracket 130 can be designed accordingly. Extended flight tests have shown that an optimum value for the angle X is from 35 to 40 degrees, the precise angle being somewhat critical for maximum effectiveness.

In the complete installation the servo control cables 186 and 188 are secured to the existing aileron control cables 196 and 198, respectively, by means of cable clamps 200. The aileron control cables 196 and 198 are connected to the conventional control column 202 and actuate the ailerons 204 and 206 through actuating mechanism 208. Since the arrangement of controls varies considerably in different aircraft, the installation is shown diagrammatically in FIGURE 12. In certain types of aircraft, the rudder 210 is coupled by control cables 212 and 214 to the aileron balance cable 216, so that rudder and ailerons are coordinated, spring type couplers 218 being used in the connections to compensate for motion differences. Alternatively the flight control may be pneumatically connected to the rudder by using additional actuators coupled to the rudder cables. The arrangement illustrated is an example and is applicable only to certain aircraft, the flight control means normally being coupled to the ailerons only. The venturi 12 is mounted in a suitable position externally of the aircraft and is connected by a vacuum supply hose 220 to the vacuum outlet 34.

In operation, a rolling motion of the aircraft causes the sensing instrument 10 to rotate about the gyro gimbal axis while the gyro 22 remains static. The guide pin 38 connected to the gyro 22 is thus moved inside the casing 20 and pulls the prongs 122 to one side, as indicated in broken line in FIGURE 4, so rotating the valve stem 100 in relation to the roll of the aircraft. With the barrel valve 84 in the on position, a steady vacuum is applied at the lower port 54 of valve sleeve 50 and, due to the slight clearance between the valve element 110 and said valve sleeve, the resultant small leakage causes the vacuum to be applied through the left and right passages 64 and 66 to the actuators 16 and 18, maintaining a constant light tension on the actuators to prevent any slack in the system. With the barrel valve 84 in the off position the actuators are vented to atmosphere and no motion is applied to the control surfaces.

When the valve stem 100 rotates, the valve element 110 tilts and the channels 112 and 114 uncover the left and right ports 56 and 58. According to the direction of tilt of valve element 110, the vacuum at the lower port 54 is applied, through either the left passage 64 or the right passage 66, to the actuator 16 or 18, so drawing in the particular piston 178 and pulling the servo control cable 186 or 188 to apply a correcting motion, through the ailerons, to bring the aircraft back to a level position. While one of the passages 64 or 66 is open to the vacuum, the other is open to atmosphere through the upper passage 60 and the inlet chamber 68, allowing the non-operative actuator to expand in relation to the contraction of the operative actuator, the controls remaining in balance at all times. By turning the adjusting plug 104 in or out, the vacuum leak and the initial sensitivity may be controlled, the required setting being made at the time of installation and requiring little, if any, adjustments. In flight, the sensitivity valve 152 is used to adjust the sensitivity of the system to suit existing air turbulence.

The system can easily be zeroed for straight line flight by means of the centering drum 136 which, when rotated, moves along the threaded shaft 138, shifting the control bar 144 to one side or the other. This motion rotates the valve sleeve 50 very slightly and has the same effect as a preset tilt of the valve element 110 to correct for any inherent out of trim condition of the aircraft. Other than the on-off control of the barrel valve 84, the sensitivity valve 152 and the centering drum 136 are the only controls which need to be adjusted in flight.

Figure 7:
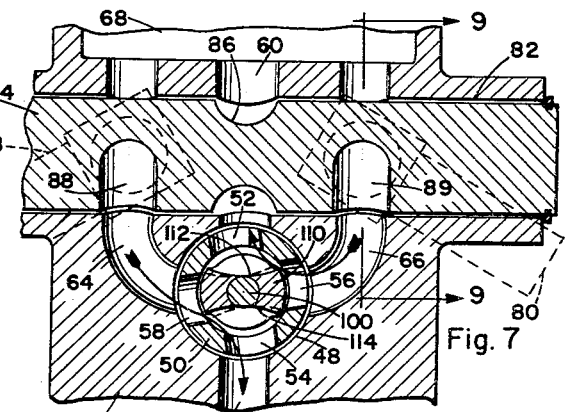
FIGURE 7 is a fragmentary sectional view similar to FIGURE 5, but showing the valve in on position.
Figure 6:
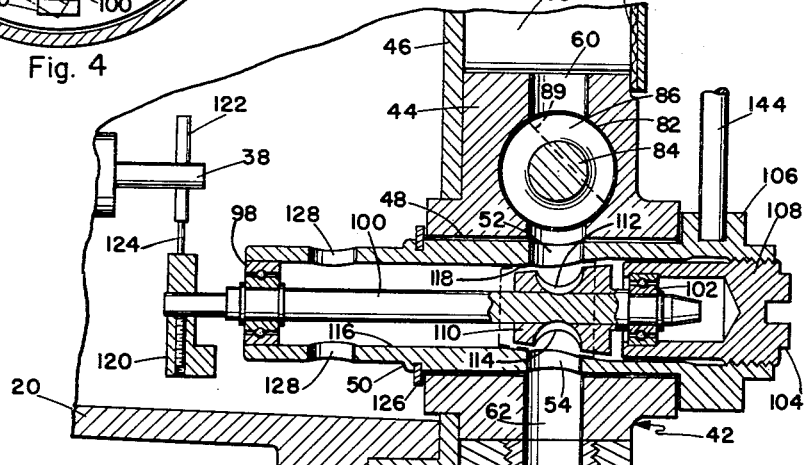
FIGURE 6 is a fragmentary sectional view taken on the line 6—6 of FIGURE 5.

A particular advantage of the system is in the use of the control bar 144 to fly the aircraft in a steady turn by using the control bar in the manner of a conventional control column. Since rotation of the valve sleeve 50 causes a relative tilt of the sleeve to the valve element 110, as indicated in FIGURE 7, the action allows the existing vacuum to be applied to one of the actuators through the uncovered port and passage, to actuate the ailerons and bank the aircraft. The length of the centering drum 136 may be designed so that by moving the control bar 144 fully to one side against the enlarged knurled portion 142, as indicated in dash line in FIGURE 2, the offset of the valve sleeve 50 is sufficient to put the aircraft into a standard rate two turn or, a 360° turn in two minutes. As the aircraft reaches the angle of bank necessary to hold the turn, the gyro 22, due to its precession, returns the valve element 110 to neutral relative to the valve sleeve 50, closing the ports and returning the ailerons to neutral to hold the aircraft in a steady, turn, or even reversing the valve action of over control has occurred. The control bar 144 may be moved to any intermediate position on the centering drum 136 to obtain slower turns, a feature which is very useful in landing approaches or circuiting an area. Final adjustment of the system to obtain a correct rate turn with the control bar 144 fully offset is accomplished by adjustment of the valve 32, which controls the air inlet to drive the gyro 22, the gyro speed thus being adjusted to obtain the correct degree of response.

For convenience, an indication of the operation of the flight control means is desirable and this is provided by the indicator 14, which is a conventional left-right indicator operated by pressure differential at two inlets 222 and 224. The inlets 222 and 224 are connected by hoses 226 and 228 to tap connections 230 and 232 on the inlets 166 of actuators 16 and 18. Thus the pressure differential between the two actuators causes the indicator 14 to show the action of control, either to left or right. A steady indication to one side or the other indicates a lack of trim in the aircraft, but this is easily corrected by adjusting the centering drum 136.

It has been found in test flights that the system is smooth and firm in operation, requiring little attention for prolonged periods. The system can be overpowered manually as in take-off and landing and at any time in an emergency and requires no cut-outs or override devices. Mechanical tolerances are not abnormally critical when compared with other types of autopilots and, as a result, the system operates freely without tendency to jam or seize up. Installation is simple due to the few compact components, which can be installed in an aircraft without interfering with the existing controls or instrumentation. The gyro unit itself could be installed at any suitable location in the aircraft, in proper alignment, and connected to the remainder of the system in a suitable manner. The entire system is extremely light in weight for a mechanism of its type and is easy to manufacture at a minimum of cost, the single rate gyro providing a degree of control equal to that of other systems employing multiple gyros and complex electrical systems.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. In an aircraft having control surfaces to effect roll and yaw motions of the aircraft, a flight control means comprising: a pair of vacuum operated actuators for operative connection to said control surfaces; a source of vacuum; a valve assembly including a body; a generally cylindrical sleeve mounted in said body and having limited rotation therein; a valve element freely rotatably mounted in said sleeve; said body having a pair of outlets communicating through said sleeve to said source of vacuum; said actuators being connected to said outlets; said valve element having channels therein to connect said outlets selectively to said source of vacuum by rotation of the valve element; alignment means attached to said valve element to hold the same in a neutral position partially obstructing both of said outlets equally; a rate sensitive gyro pivotally mounted on an axis inclined in a generally vertical plane to the roll axis of the aircraft, whereby said gyro is sensitive to roll and yaw motions of the aircraft; said gyro being operatively connected to said alignment means to shift said valve element and thereby apply correcting motions to said control surfaces corresponding to the motions of the aircraft.

2. In an aircraft having control surfaces to effect roll and yaw motions of the aircraft, a flight control means comprising: a pair of vacuum operated actuators for operative connection to said control surfaces; a source of vacuum; a valve assembly including a body; a generally cylindrical sleeve mounted in said body and having limited rotation therein; a valve element freely rotatably mounted in said sleeve; said body having a pair of outlets communicating through said sleeve to said source of vacuum; said actuators being connected to said outlets; said valve element being rotatable to apply vacuum to said actuators selectively; a rate sensitive gyro pivotally mounted on an axis inclined in a generally vertical plane to the roll axis of the aircraft, whereby said gyro is sensitive to roll and yaw motions of the aircraft; said gyro being operatively connected to shift said valve element to apply correcting motions to said control surfaces corresponding to the motions of the aircraft; and means for rotating said sleeve relative to said valve element so that vacuum can be applied in varying ratio to said actuators selectively, independently of the action of said sensing gyro.

3. In an aircraft having control surfaces to effect roll and yaw motions of the aircraft, a flight control means comprising: a pair of vacuum operated actuators for operative connection to said control surfaces; a source of vacuum; a valve assembly including a body; a generally cylindrical sleeve mounted in said body and having limited rotation therein; a valve element freely rotatably mounted in said sleeve; said body having a pair of outlets communicating through said sleeve to said source of vacuum; said actuators being connected to said outlets; said valve element being rotatable to apply vacuum to said actuators selectively; a rate sensitive gyro pivotally mounted on an axis inclined in a generally vertical plane to the roll axis of the aircraft, whereby said gyro is sensitive to roll and yaw motions of the aircraft; said gyro being operatively connected to shift said valve element to apply correcting motions to said control surfaces corresponding to the motions of the aircraft; a control bar extending substantially radially from said sleeve; a drum shiftably mounted along an axis normal to the axis of said sleeve; said drum having a central annular groove to receive and hold said control bar; and stop portions on said drum at opposite sides of said groove to limit the movement of said control bar, whereby said sleeve can be rotated to predetermined positions relative to said valve element.

4. In an aircraft having control surfaces to effect roll and yaw motions of the aircraft, a flight control means comprising: a pair of vacuum operated actuators for operative connection to said control surfaces; a source of vacuum; a valve assembly including a body; a generally cylindrical sleeve mounted in said body and having limited rotation therein; a valve element freely rotatably mounted in said sleeve; said body having a pair of outlets communicating through said sleeve to said source of vacuum; said actuators being connected to said outlets; said sleeve having a tapered bore portion; said valve element being axially tapered corresponding to said bore portion; and said valve element being axially adjustable in said sleeve to vary the annular clearance between the valve element and said bore portion; said valve element having channels therein to connect said outlets selectively to said source of vacuum by rotation of the valve element; a shut-off valve between said outlets and said source of vacuum and operable to vent said outlets to atmosphere; a rate sensitive gyro pivotally mounted on an axis inclined in a generally vertical plane to the roll axis of the aircraft, whereby said gyro is sensitive to roll and yaw motions of the aircraft; said gyro being operatively connected to shift said valve element to apply correcting motions to said control surfaces corresponding to the motions of the aircraft; and means for rotating said sleeve to predetermined positions relative to said valve element.

5. In an aircraft having control surfaces to effect roll and yaw motions of the aircraft, a flight control means comprising: a pair of vacuum operated actuators operatively connected to move said control surfaces in different directions; a sensing instrument having a casing; a vacuum operated, rate sensitive gyro pivotally mounted in said casing; a source of vacuum connected to said casing; a valve assembly mounted on said casing; said valve assembly including a body having a pair of outlets; said actuators being connected to said outlets; a generally cylindrical sleeve mounted in said body and having limited rotation therein; a vacuum inlet in said body connected to said source of vacuum; said sleeve having ports communicating with said inlet and said outlets; a valve element freely rotatably mounted axially in said sleeve; said valve element having channels therein to connect said outlets selectively to said inlet by rotation of the valve element; said gyro being operatively connected to rotate said valve element according to the motions of the gyro; and means for mounting said sensing instrument in the aircraft with the pivotal axis of said gyro inclined in a vertical plane to the roll axis of the aircraft, whereby said gyro is sensitive to roll and yaw motions of the aircraft; and means for rotating said sleeve to predetermined positions relative to said valve element.

6. Flight control means according to claim 5 and wherein said vacuum inlet is connected to said casing; said casing constituting a plenum chamber connected to said source of vacuum; and a sensitivity control valve connected between said inlet and said casing.

7. In an aircraft having control surfaces to effect roll and yaw motions of the aircraft, a flight control means comprising: a pair of vacuum operated actuators operatively connected to move said control surfaces in different directions; a sensing instrument having a casing; a vacuum operated, rate sensitive gyro pivotally mounted in said casing; a source of vacuum connected to said casing; a valve assembly mounted on said casing; said valve assembly including a body having a pair of outlets; said actuators being connected to said outlets; a generally cylindrical sleeve mounted in said body and having limited rotation therein; a vacuum inlet in said body connected to said source of vacuum; said sleeve having ports communicating with said inlet and said outlets; a valve element freely rotatably mounted axially in said sleeve; said valve element having channels therein to connect said outlets selectively to said inlet by rotation of the valve element; alignment means attached to said valve element to hold the valve element in a neutral position obstructing both of said outlets; means for rotating said sleeve relative to said valve element; said gyro being operatively connected to said alignment means to rotate said valve element according to the motions of the gyro; and means for mounting said sensing instrument in the aircraft with the pivotal axis of said gyro inclined in a vertical plane to the roll axis of the aircraft, whereby said gyro is sensitive to roll and yaw motions of the aircraft.

8. In an aircraft having control surfaces to effect roll and yaw motions of the aircraft, a flight control means comprising: a pair of vacuum operated actuators operatively connected to move said control surfaces in different directions; a sensing instrument having a casing; a vacuum operated, rate sensitive gyro pivotally mounted in said casing; a source of vacuum connected to said casing; a valve assembly mounted on said casing; said valve assembly including a body having a pair of outlets; said actuators being connected to said outlets; a generally cylindrical sleeve mounted in said body and having limited rotation therein; a vacuum inlet in said body connected to said source of vacuum; said sleeve having ports communicating with said inlet and said outlets; a valve element freely rotatably mounted axially in said sleeve; said valve element having channels therein to connect said outlets selectively to said inlet by rotation of the valve element; alignment means attached to said valve element to hold the valve element in a neutral position obstructing both of said outlets; a control bar extending substantially radially from said sleeve; a drum shiftably mounted along an axis normal to the axis of said sleeve; said drum having a central annular groove to receive and hold said control bar; stop portions at the ends of said drum to limit the movement of said control bar, so that said sleeve can be rotated to predetermined positions relative to said valve element; said gyro being operatively connected to said alignment means to rotate said valve element according to the motions of the gyro; and means for mounting said sensing instrument in the aircraft with the pivotal axis of said gyro inclined in a vertical plane to the roll axis of the aircraft, whereby said gyro is sensitive to roll and yaw motions of the aircraft.

9. Flight control means according to claim 7 and wherein said sleeve has a tapered bore portion; said valve element being axially tapered corresponding to said bore portion; said valve element being axially adjustable in said bore portion to vary the annular clearance therebetween.

References Cited in the file of this patent

UNITED STATES PATENTS

| | | |
|---|---|---|
| 2,199,256 | De Florez | Apr. 30, 1940 |
| 2,499,471 | Dunning | Mar. 7, 1950 |
| 2,753,835 | Gehrig | July 10, 1956 |
| 2,863,321 | Weiland | Dec. 9, 1958 |